United States Patent [19]
Edwards

[11] 3,874,106
[45] Apr. 1, 1975

[54] HOOK SETTING DEVICE

[76] Inventor: Scott M. Edwards, 6845 Fairways Dr., Longmont, Colo. 80501

[22] Filed: Aug. 20, 1973

[21] Appl. No.: 389,838

[52] U.S. Cl. .................................................. 43/15
[51] Int. Cl. ............................................ A01k 85/02
[58] Field of Search .................................. 43/15, 16

[56] References Cited
UNITED STATES PATENTS

| | | | |
|---|---|---|---|
| 716,726 | 12/1902 | Leib | 43/15 |
| 1,317,843 | 10/1919 | Wenner et al. | 43/16 |
| 1,558,916 | 10/1925 | Pennell | 43/15 |
| 1,665,144 | 4/1928 | Murray | 43/15 |
| 1,805,410 | 5/1931 | McCall | 43/15 |
| 2,575,852 | 11/1951 | Trowbridge | 43/16 |
| 2,712,194 | 7/1955 | Distefano | 43/15 |

Primary Examiner—Warner H. Camp
Attorney, Agent, or Firm—Thomas W. O'Rourke

[57] ABSTRACT

A device insertable in the fishing line adjacent the leader or lure portion and including spring means, preferably a hairpin spring, attached to the leader or lure portion of the fishing line, and trigger means to activate the spring means to promptly and positively pull upon the leader in response to a tug thereon.

8 Claims, 3 Drawing Figures

PATENTED APR 1 1975 3,874,106

HOOK SETTING DEVICE

BACKGROUND OF THE INVENTION

1. Field of the Invention

The present invention relates generally to a fishing device, and more particularly to a fishing device for automatically setting a hook promptly and positively in response to a pull thereon generated by a fish taking a baited hook or lure.

2. Description of the Prior Art

It is, of course, well known that, in a conventional process of fishing, a lure or bait is offered to fish. When a fish takes the baited hook into its mouth, it is critical that the hook be set by a rapid pull or jerk upon the fishing line. If this is not done promptly, the fish will sense the resistance of the line or the presence of the hook and reject the bait or lure.

The quite fallible response of the fisherman to the subtle tug by the fish upon the bait or lure has given rise to automatic hook-setting devices such as described in U.S. Letters Pats. 2,887,812 and 3,899,768. While these prior art devices have the advantage of a prompt and automatic response to the taking of the hook by a fish, certain inadequacies exist. Both of these prior art devices are mounted upon the fishing pole and thereby upset the balance and feel of the fishing pole when casting or otherwise manipulating it. Also, because a substantial length of fishing line is usually utilized between the fishing pole and the bait, the accumulated slack therein is rather substantial thereby giving rise to a lag in response at the hook to minor movements of the line at the pole. In fact, one of the prime reasons for the use of a fishing pole is to afford the fisherman substantial leverage in promptly taking up this slack and setting this hook. However, the prior art's hook-setting devices make use of a very short lever arm or means to take up the rather substantial slack in the line. This not only adds to the undesirable bulk of the hooksetting device on the pole, but also does not provide sufficient movement to completely avoid the lag in response at the hook caused by slackness of line between the hook setter and the hook.

SUMMARY OF THE INVENTION

The present invention, which provides a heretofore unavailable improvement over previous hook-setting devices, comprises a means or device which is quite compact and therefore may be utilized in the fishing line in a conventional function, for instance, as a weight or sinker or as a bobber or bubble, depending upon the preference of the user. The device, being closely adjacent the hook, avoids the heretofore troublesome problem of being remote from the hook and thereby having a substantially reduced response time and effect upon a taking of the hook by a fish.

The compact nature of the instant invention is afforded by a simple spring means, preferably a hairpin spring, in conjunction with a simple and responsive trigger means which releases the spring means in response to a tug by a fish.

Accordingly, an object of the present invention is to provide a new and improved device for automatically hooking fish in response to a tug on the hook by the fish.

Another object of the present invention is to provide a compact and lightweight device for hooking fish which may be incorporated into the fishing line without materially altering the conventional weight and feel of such fishing line.

Yet another object of the present invention is to provide a new and improved automatic fish-hooking device which is employed in the fish line closely adjacent the fish hook.

Still another object of the present invention is to provide a new and improved fish-hooking device with substantially improved response and transmission of response upon initial taking of the hook by a fish.

These and other objects and features of the present invention will become apparent from the following description.

DETAILED DESCRIPTION OF THE INVENTION

Figure 1:
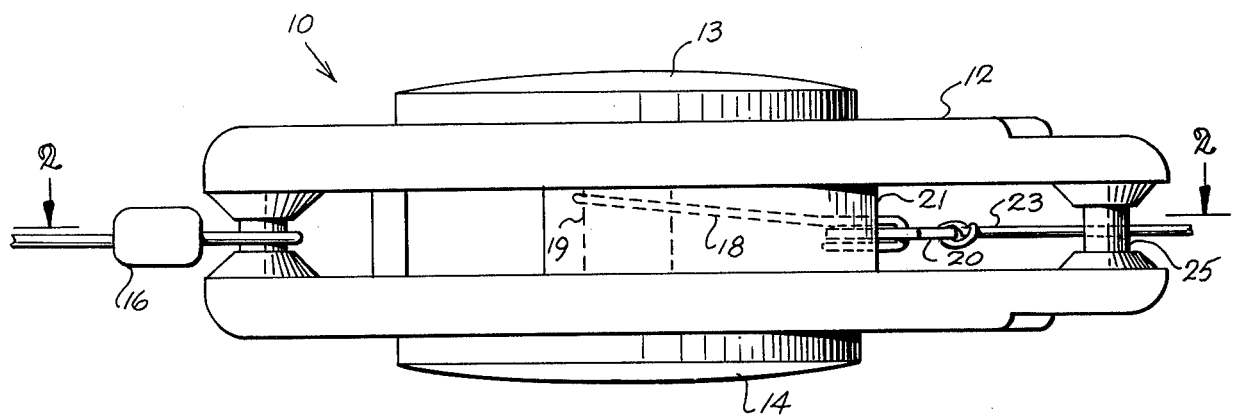
FIG. 1 is a side view of a device according to the instant invention.
Figure 2:
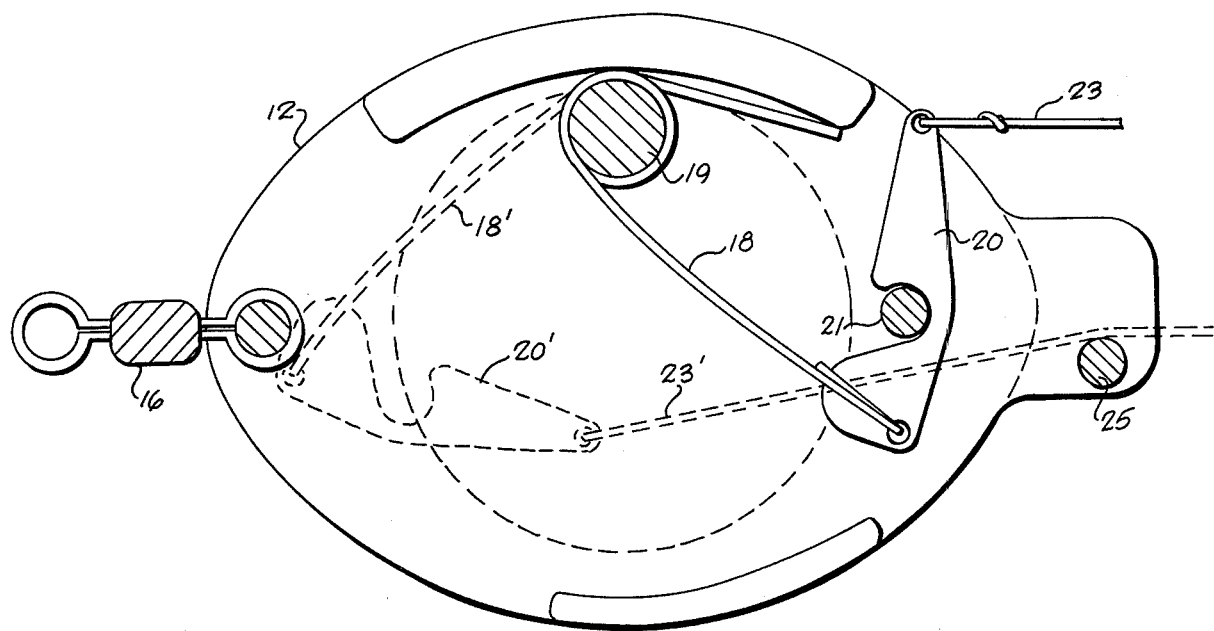
FIG. 2 is a sectioned top view along the plane of line 2—2 of the device of FIG. 1.

Turning now to the drawings, wherein like components are designated by like reference numerals throughout the various figures, a device for promptly and automatically setting the hook upon the taking thereof by a fish is illustrated in a "sinker" mode in FIGS. 1 and 2, and is generally designated by the reference numeral 10. Device 10 comprises a body portion 12 having, in accordance with the optional function of serving as a sinker, upper ballast 13 and lower ballast 14. At one end of body 12 is a swivel 16 adapted to function in the usual manner of attachment to a fishing line and, accordingly, to the fishing pole. Mounted within the open interior of and secured to body 12 is a spring means specifically and preferentially illustrated as hairpin spring 18. Hairpin spring 18 is attached and secured around pivot 19 and, when set, to trigger means 20 which, in turn, is secured releasably by a post 21. A leader 23 is attached to a hook (not shown) at one end and is attached at the other end thereof to trigger means 20.

As shown in detail in FIG. 2, when a fish takes the hook attached to leader 23, a modest tension on leader 23 rotates trigger means 20 around post 21 and thereby releases hairpin spring 18. Hairpin spring 18, being thus freed by trigger means 20, snaps to the position shown as hairpin spring 18'. Accordingly, trigger means 20' and leader 23' are, upon release, quickly and automatically snapped into the positions shown. Guide 25 functions to position leader 23' in a position substantially opposite that of swivel 16 to provide a direct and constant force path through device 10 from leader 23' to swivel 16.

Since spring 18 is attached directly to leader 23 through trigger means 20, a minimum of slack between hairpin spring 18 and the hook is involved. Accordingly, the motion imparted as hairpin spring 18 moves to position 18' is promptly and directly imparted to the hook.

Figure 3:
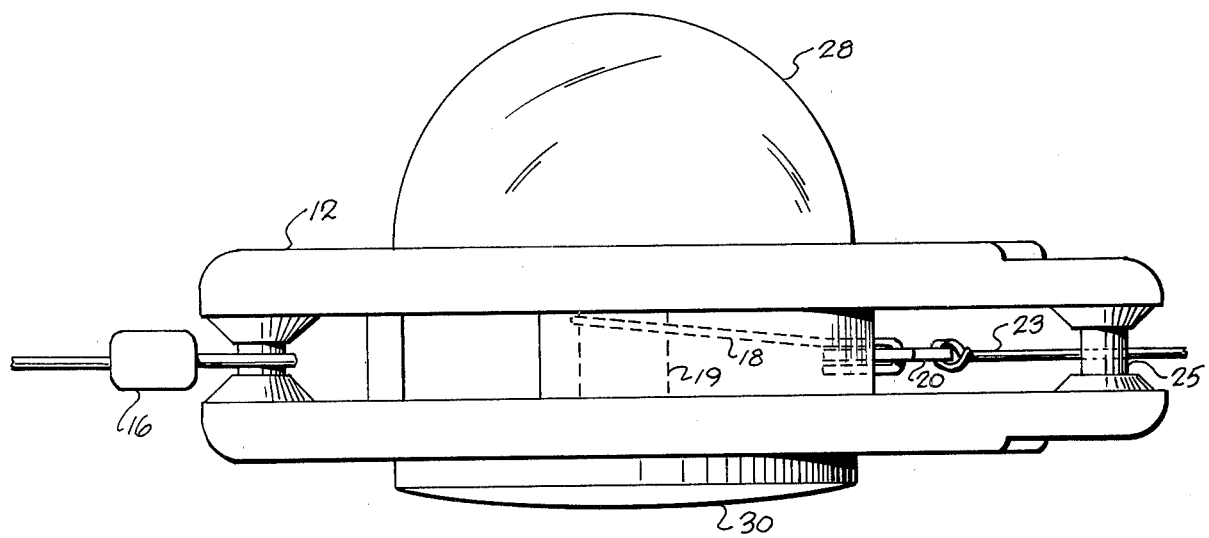
FIG. 3 is a side view of another embodiment of the device of the instant invention.

Another function essentially identical to that of FIGS. 1 and 2 is shown in FIG. 3 wherein the hooking device is employed in a float or bubble mode. Accordingly, a float portion 28, which may be of a light material such as cork or a hollow hemisphere, is attached to the upper portion of body 12. A ballast weight 30 may optionally be attached to the bottom portion of body 12 to lend stability to the device. Otherwise, the function of hairpin spring 18, triggering means 20 and leader 23 is identical to that of FIGS. 1 and 2.

From the above description and illustration, it will be apparent that the device of the instant invention may be inserted in a conventional fish line configuration to serve without disadvantage the conventional function of a float, bubble, sinker or other such device which is conventionally provided adjacent the hook. As a float or sinker, sufficient mass is present in the device per se to provide a substantial reaction to the snapping of the spring to the release position upon tripping of the triggering means by a fish. Accordingly, even though there may be slack in the line between the fishing pole and the hooking device, the hook will be set automatically at a prompt and optimum time, i.e., upon the initial tugging of the fish upon the bait or lure incorporating the hook.

Although only two embodiments of the invention have been illustrated and described, it is apparent that various changes and modifications will be made by those skilled in the art and that such changes and modifications may be made without departing from the scope of the invention as defined by the following claims.

What is claimed is:

1. A device for setting a fishhook in response to the taking of a hook by a fish, comprising: a compact body member having means for attachment to a fish line from a fishing pole at one end of the body member, the body member having an open interior defined therein, spring means secured to the body member within the open interior and including a provision for operable connection of the spring means to the line to which the hook is attached, a post member positioned within the open interior, trigger means constituting part of the spring means for releasably securing the spring means to the post member in a distended position, the trigger means including an elongated structure having an open notch in one side thereof, provision for attachment to the fish line to which the fishhook is secured on one end, and provision for attachment to a spring member comprising part of the spring means on the other end, whereby the hook-setting device may be secured along the length of the fish line and played out with the fish line to provide a prompt release of the distended spring means to automatically set the hook through a minimum length of fish line, and with the movable components of the device within the body member to avoid fouling.

2. A device as set forth in claim 1 wherein the spring means is a hairpin spring secured to the body member by a pivot projection within the body member.

3. A device as set forth in claim 1 wherein ballast is attached to the body member to permit the device to serve the function of a sinker.

4. A device as set forth in claim 1 wherein floatation is attached to the body member to permit the device to serve the function of a float.

5. A device for setting a fishhook in response to the taking of the hook by a fish, comprising: a compact body member having means for attachment to a fish line at one end of the body member, the compact body member having defined therein an open interior, a hairpin spring mounted within the body member by coiling around a pivot projection within the body member, a trigger structure contained within the body member attached at one end to an end of the hairpin spring and having a provision at the other end for attachment to a fish line to which the hook is secured, the trigger structure having an open notch defined in one side thereof and adapted to receive a post projection within the body member to releasably secure the trigger structure and the end of the hairpin spring in a distended position, the trigger structure and, accordingly, the hairpin spring, being releasable from the post projection upon a pull on the end of the trigger structure having provision for attachment to the fish line to which the fishhook is secured, whereby the spring and trigger structure are compactly housed within the body member for protection from fouling upon release.

6. A device as set forth in claim 5 wherein a fish line is secured to the means for attachment at one end of the body member, and the fish line to which the fish hook is secured is attached to the end of the trigger structure having provision for such attachment.

7. A device as set forth in claim 5 wherein ballast is attached to the body member to permit the device to serve the function of a sinker.

8. A device as set forth in claim 5 wherein floatation is attached to the body member to permit the device to serve the function of a float.

* * * * *